UNITED STATES PATENT OFFICE.

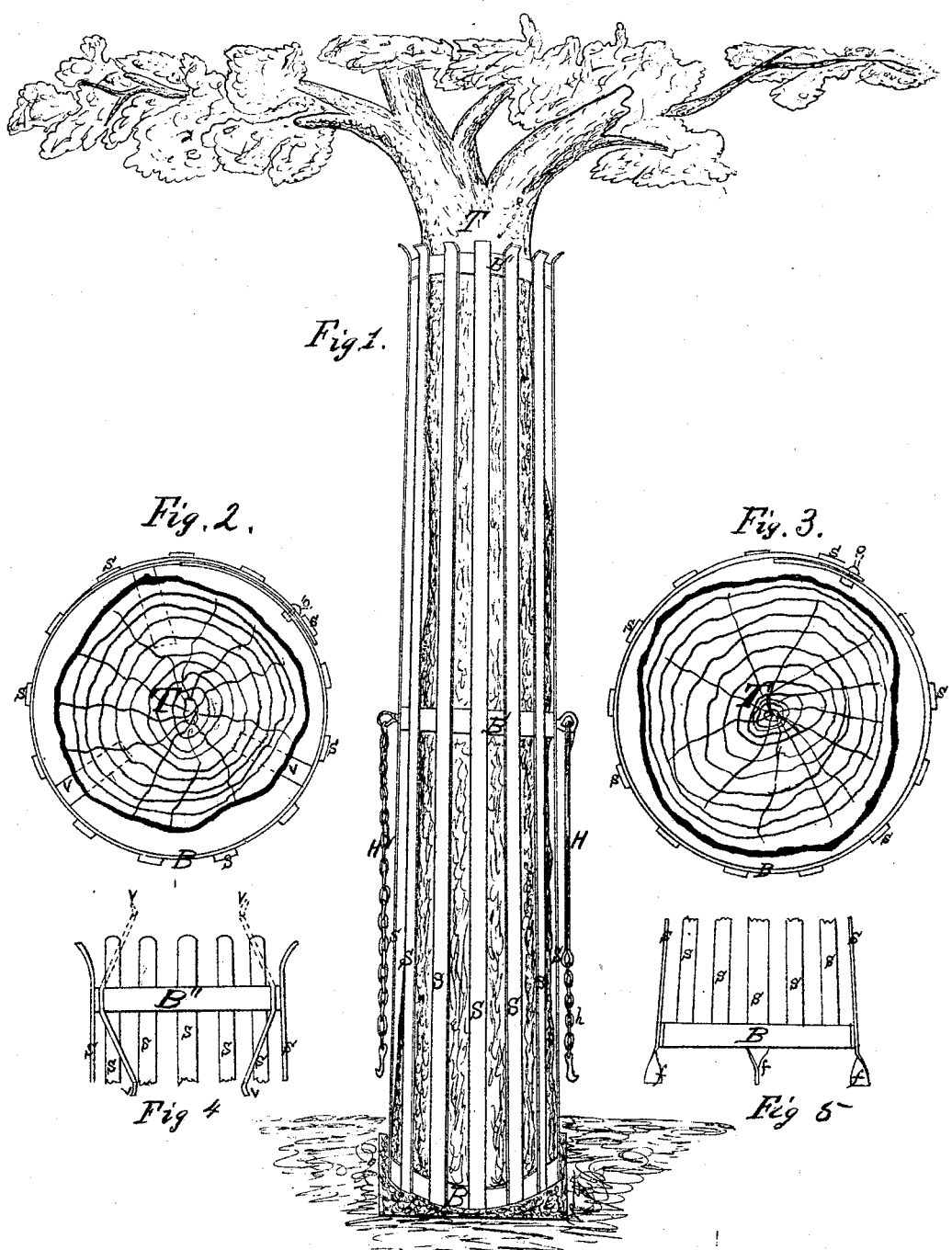

JOHN GIBSON, JR., OF ALBANY, NEW YORK.

IMPROVEMENT IN TREE-BOXES.

Specification forming part of Letters Patent No. 118,925, dated September 12, 1871.

*To all whom it may concern:*

Be it known that I, JOHN GIBSON, Jr., of the city and county of Albany and State of New York, have invented certain new and useful Improvements in the Mode of Constructing Tree-Boxes, whereby the size of the box may be adapted to the present size of a tree and also be readily expanded or enlarged to suit the increased growth of the tree, and whereby both the tree and the box are mutually supported and steadied; and I do hereby declare that the following is a full, clear, and exact description thereof, reference being had to the accompanying drawings making a part of this specification and the letters of reference marked thereon, the same letters indicating like parts, in which—

Figure 1 is a perspective view of a tree encased within a tree-box. Fig. 2 represents a vertical section of tree-box surrounding a tree of small growth. Fig. 3 represents the same box expanded or enlarged to suit the increased growth of the tree. Fig. 4 is a section, showing the upper steadiments for impinging the trunk of the tree. Fig. 5 is a section, showing the lower steadiments for entering the ground.

The nature of my invention consists in constructing a tree-box of bars or slats of iron, wood, or other suitable material, or of woven wire, secured to one or more horizontal bands for encircling the trunk of a tree to protect the same from injury. The said band or bands have a larger diameter than the present size of the tree requires, and, when placed about a tree, the ends of these bands lap, and are then fastened by bolt or wire or other suitable fastening. From time to time, as may be required by the growth of the tree, these bands may be let out or the lap lessened and again fastened as before.

To give a proper steadiment and support at the base of the tree-box, and also to prevent the box from being mischievously revolved, one or more of the upright slats or bars of the box may be projected below the lower horizontal band to enter the ground a few inches, or equivalent pieces or feet may be attached to the box for the same purpose. The upper steadiments consist of two or more pieces of band-iron, eight inches in length, more or less, or equivalent light or elastic material, fastened to the slats or the band at the top of the box. These steadiments incline toward the tree and may project above the top of the tree-box, or may incline downward and within the tree-box, or may be thrown in both directions.

To enable others skilled in the art to make and use my invention, I will proceed to describe it in reference to the accompanying drawings and the letters of reference marked thereon.

T, Fig. 1, represents a tree incased within a tree-box. The said box is constructed of the bands B B' B'', (which bands may be made of one or more pieces, each jointed, if desired,) making a larger diameter when bent than required by the present size of the tree. This diameter is contracted by overlapping the ends of the bands, as shown in Fig. 2. The ends of each band are provided with a number of holes, and the laps may be held together by the bolts O passing through these holes or by wire or their equivalents. When the growth of the tree has increased, the bands may be distended by lessening the lap, as shown in Fig. 3, and again fastened. Riveted or otherwise attached to the bands B B' B'' are the slats or bars S. These slats or bars may be made of iron or wood, of any desirable form; or woven wire, or perforated sheet metal, or cast-metal plates in sections may be substituted as equivalent for said slats or bars S; and, when made of metal, may with the bands be galvanized in whole or in part to preserve from rust. For support and steadiment at the base of the tree-box, if bars of flat iron are used for slats, one or more are allowed to project downward several inches below the lower band, terminating in a quarter-twist, as feet *f*, Fig. 5. These projecting pieces or feet enter the ground a short distance, and serve to prevent the tree-box from being turned or moved from position. If the slats S S be made of other material than flat bars of iron I prefer similar feet or projections, *f*, of the same or equivalent form, fastened to the bottom of the tree-box in any suitable manner. To steady the top of the box and to support the tree I fasten to the band B'' the metal strips V V, Figs. 2 and 4. The said strips V V are about eight inches in length, more or less, and may turn downward within the box or may project above the box, as shown by dotted lines, Fig. 4, and, being elastic, will impinge the tree without injury to it. To afford farmers and fruit-growers an inexpensive tree-box to protect their grafted and other small trees against injury (by animals or otherwise) during the first few years of their growth, I make the slats S about three or four feet long and dispense with the upper and lower bands and use only the center band B′, the ends of which are overlapped and made adjustable, and secured as above described. The lower ends of the slats S enter the ground a short distance, sufficient to steady the box, while the upper ends, the first year of the growth of the graft, may be nearly closed to protect the grafts or sprouts, and in subsequent years the band may be let out or lengthened to suit the increased growth of the tree. This tree-box is also furnished with a hitching device, which may consist of the rod H furnished with the chain $h$ or of the chain H′, as shown in Fig. 1. The said hitching device is connected with the tree-box by means of a staple or eyebolt, as shown. To the lower or outer end of the said hitching device I would attach a hook or snap for convenience in hitching a horse. By thus combining the said hitching device with a tree-box, especially in cities, the necessity and expense of a separate hitching-post is obviated, and the tree-box, being supported and steadied by the tree within, is made to perform the double duty of protecting the tree and also holding a horse secure when hitched thereto.

Having described my invention, what I claim is—

1. An expanding tree-box, consisting of the slats S or equivalents, as described, secured to one or more bands, B B′ B″, and so constructed and arranged as to afford means for the contracting or expanding of its capacity, the said means consisting in the employment of the element of coiling or lapping one part or end of the said bands within or over the other, substantially as and for the purpose herein set forth.

2. In combination with a tree-box, the elastic impinging pieces V, (projecting downward or upward, or in both directions,) substantially as described, for the purpose set forth.

3. In combination with a tree-box, the hitching device, consisting of the rod H with its chain $h$ or its equivalent H′, substantially as described, for the purpose set forth.

4. The twisted feet $f$, being a continuation of the slats S or attached thereto, or fastened to the band B, as and for the purpose specified.

JOHN GIBSON, JR.

Witnesses:
JNO. H. GIBSON,
A. L. GIBSON.